April 21, 1953
R. R. LOBOSCO
2,636,102
AUTOMATIC METAL ARC WELDING SYSTEM
Filed June 27, 1950
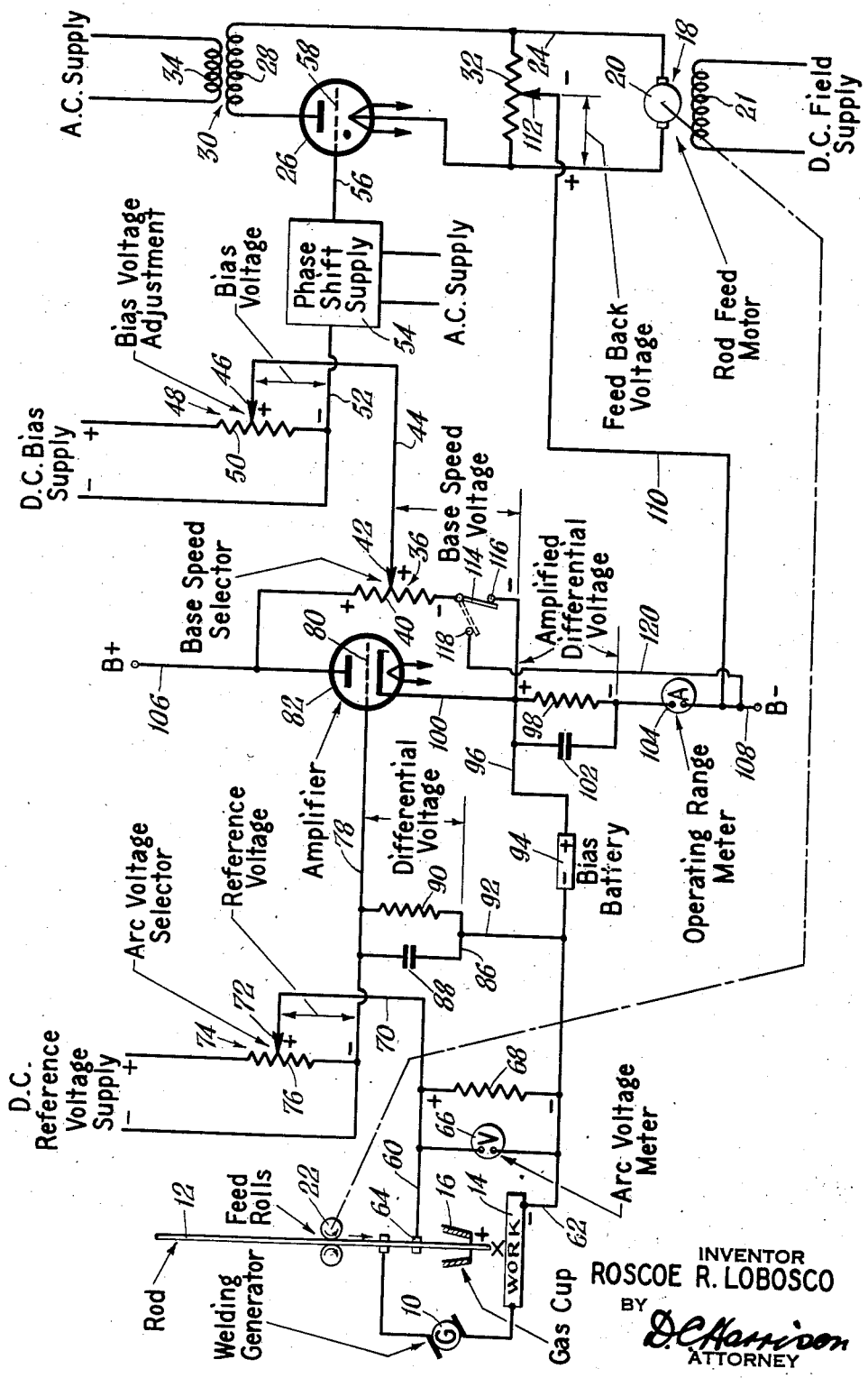
INVENTOR
ROSCOE R. LOBOSCO
BY
D.C. Harrison
ATTORNEY Patented Apr. 21, 1953

2,636,102

UNITED STATES PATENT OFFICE 2,636,102

AUTOMATIC METAL ARC WELDING SYSTEM

Roscoe R. Lobosco, Elizabeth, N. J., assignor, by mesne assignments, to Union Carbide and Carbon Corporation, a corporation of New York Application June 27, 1950, Serial No. 170,597

12 Claims. (Cl. 219—8)

This invention relates to automatic metal arc welding, and more particularly to an improved system for automatically controlling the feeding of a welding electrode adapted to be fused and deposited upon work constituting a cooperative electrode.

The prior art is exemplified by Clapp 2,260,510, Jones 2,223,177, and Kennedy et al. 2,145,010, the controls of which, while suitable for submerged melt welding of the type disclosed by Jones et al. 2,043,960, are not precise enough to secure optimum results for controlling argon or helium shielded metal arc welding of the type disclosed by Hobart 1,746,081 and Devers 1,746,191, especially where the metal is usually hard to weld, such as aluminum, stainless steel and magnesium.

The main object of this invention is to provide an improved and more precise automatic metal arc length control system which is not only satisfactory for inert gas shielded welding but also for submerged melt and open-arc welding. Other objects will appear in the following description.

In the past a common fault of sensitive arc voltage controls was that they tended to hunt i. e. the rod constantly wavered between overspeed and underspeed. While the resulting average speed was close to the desired speed, such fluctuations in speed are undesirable and may cause poor welds. According to the invention such fluctuations are reduced to a minimum by feeding into the control circuit a voltage proportional to the speed of the rod feed motor. This procedure permits a much greater sensitivity than can otherwise be accomplished.

According to the invention there is provided an automatic metal arc welding system wherein the rate of feed of a metal welding electrode or rod is automatically controlled so as to maintain a substantially constant preselected arc voltage. The rate of rod feed is determined by the speed of a rod feed motor. The speed of the rod feed motor is controlled by a speed control circuit. The speed control circuit, in turn, is responsive to the combined outputs of a base speed selector, which is set by the operator to produce an output which results in approximately the correct rod feed motor speed necessary to maintain a desired arc voltage; an amplifier which delivers an error or differential output which is proportional to the difference between the desired arc voltage and the actual arc voltage at any instant, and a circuit which delivers an output which is proportional to the speed of the motor. The effect of these three outputs on the speed control circuit causes the rod feed motor to feed the rod at a speed which maintains the desired arc voltage.

The amplified error voltage is obtained by adjusting an arc voltage selector to deliver a reference voltage approximately equal to the desired arc voltage. Such reference voltage is fed into a comparing circuit which compares it with the actual arc voltage. If the arc voltage does not equal the reference voltage the comparing circuit feeds an error voltage proportional to the difference between these two voltages, to the amplifier.

The amplifier amplifies the error voltage and feeds its output into the speed control circuit. The actual amount by which the differential voltage is amplified will depend on various factors. Thus the amplification can be greater than one, equal to one or less than one. It is obvious that where the desired amplification is unity or less the amplifier can be dispensed with and all or part of the differential voltage can be fed directly into the control circuit.

A voltage proportional to the desired arc voltage and a voltage proportional to the actual arc voltage when compared will give an error voltage proportional to the actual error between the desired arc voltage and the actual arc voltage. Therefore any suitable proportional method of obtaining the error or differential voltage is within the scope of the invention.

A feed-back voltage proportional to the speed of the rod feed motor can be obtained from the counter-electromotive force of the armature circuit of the rod feed motor (a shunt motor being used in this instance). However, such voltage may be obtained by other suitable means, such as a generator driven by the rod feed motor. Thus, the speed control circuit is responsive to the combined outputs of the base speed selector and the error amplifier and the feed-back voltage source. The base speed selector output serves to set the rod speed near the desired value, and the amplifier output serves as a vernier control to bring the rod speed to substantially the exact speed required to maintain the desired arc voltage and the feed back voltage serves to stabilize the rate of rod speed.

The automatic arc length control system of the invention provides a wide range, highly flexible, rod feed control for arc processes, especially argon shielded metal arc welding. Under proper operating conditions it will maintain the arc voltage to within ±0.1 volt.

Under certain conditions it may be desirable to use a constant rate of rod feed rather than the automatic arc length control. Constant speed of rod feed can be obtained by eliminating the amplified differential voltage from the control circuit of the thyratron. The desired constant speed is then selected by adjusting the base speed selector. The motor will then run at a speed at which the base speed voltage is approximately equal to the feed back voltage.

In the drawing:

The single figure is a simplified schematic circuit diagram of an automatic metal arc welding control system illustrating the invention.

As shown in the drawing, a welding generator 10 supplies welding current to an arc welding circuit which includes a welding rod 12 and work 14 constituting cooperative electrodes, as a stream of inert monatomic gas of the class consisting of argon and helium, flows from a nozzle 16 around the end portion of the rod and the area of the work surrounding the welding zone. The rod 12 is fed toward the work 14 during the welding operation by suitable means including a rod feed motor 18 having its armature 20 connected in driving relation to feed rolls 22 which engage the rod. The speed of the motor 18 is controlled by a circuit 24 including a thyratron 26, the secondary 28 of a transformer 30, and a suitable resistor 32 connected in shunt with the armature 20. The shunt field winding 21 of the motor 18 is connected to a suitable D. C. field supply, while the primary 34 of the transformer is connected to a suitable A. C. supply, as indicated.

An adjustable base speed selector 36 comprising a potentiometer 40 is coupled to the speed control circuit 24 for supplying a base speed voltage thereto for producing approximately the correct speed to maintain a desired arc voltage between the rod 12 and work 14. The adjustable contact 42 is connected by a conductor 44 to the adjustable contact 46, constituting a bias voltage adjustment 48, of a potentiometer 50 which is connected to a suitable D. C. bias supply, as shown. The negative (—) side of the potentiometer is connected by a conductor 52 to a suitable phase shift supply 54 which is, in turn, connected by a lead 56 to the control grid 58 of the thyratron 26. The phase shift supply 54 is connected to a suitable source of A. C. supply as shown.

The actual arc voltage between the welding rod 12 and work 14 during the welding operation is applied to conductors 60 and 62, one connected to a brush or contact 64 past which the rod 12 moves, and the other to the work 14. Such voltage is indicated by an arc voltage meter 66 connected across such conductors, the latter being connected to a suitable resistor 68. The positive (+) side of the resistor 68 is connected by a lead 70 to the adjustable contact 72, constituting an arc voltage selector 74, of a potentiometer 76 which is connected to a suitable D. C. reference voltage supply, as shown. A lead 78 connects the negative (—) side of the potentiometer to the control grid 80 of a space discharge tube type amplifier 82.

A comparing circuit 86 composed of a condenser 88 and a resistor 90 is connected to the lead 78 on one side, and to the negative (—) side of the resistance 68 by a conductor 92 on the other side. The latter is connected to the negative (—) side of a bias battery 94, the positive (+) side of which is connected by a lead 96 to the positive (+) side of a resistor 98 in the cathode circuit 100 of the amplifier 82. A condenser 102 is connected across the resistance 98. The circuit 100 also contains an operating range meter 104. The base speed selector potentiometer 40 is connected across the cathode-plate circuit of the amplifier 82, the plate side of such circuit being connected by a lead 106 to one terminal B+ of a suitable source of voltage; and the cathode side by a lead 108 to the other terminal B— thereof. A conductor 110 connects the latter to an adjustable contact 112 associated with the resistor 32.

In operation, direct current voltage is supplied to the adjustable arc voltage selector potentiometer 76, the contact 72 of which is adjusted to deliver across the leads 70 and 78 a selected reference voltage roughly equal to the desired welding arc voltage between the rod 12 and work 14. The actual welding arc voltage appears across the resistor 68. Such actual arc voltage and the selected reference voltage are applied in series bucking relationship on the comparing circuit 86, the difference between such voltages appearing across the comparing circuit as a differential or error voltage. Such error voltage is amplified by the space discharge tube 82 and the amplified differential or error voltage appears across resistor 98. The current through resistor 98 is indicated by the operating range meter 104.

The adjustable base speed selector potentiometer 40 is in series with resistor 98 across the source of D. C. voltage having terminals B+ and B—. Thus, any desired fraction of the voltage across terminals B+, B— can be selected by means of the potentiometer 40 for use as the base speed voltage. Potentiometer 50 supplies a selected D. C. bias voltage to the grid 58 of the thyratron 26. A phase shift voltage which lags the plate voltage of the thyratron by 90 deg. is provided in the grid circuit 50 by the phase shift supply 54.

When the armature of the direct-current shunt motor 18, used for the rod feed, is rotated, it develops a counter E. M. F. proportional to its speed. Such voltage appears across resistor 32. A part of such voltage, selected by means of the adjustable tap 112, is fed back into the grid circuit of the thyratron 26.

From the above, it is evident that the grid circuit of the thyratron 26 has impressed upon it: the amplified error voltage appearing across resistor 98; the base speed selector voltage appearing across potentiometer 40; the D. C. bias voltage appearing across potentiometer 50; an A. C. phase shift voltage lagging the plate voltage by 90 degrees; and a feed back voltage proportional to the armature speed of the rod feed motor 18. The net effect of such voltages causes the rod feed motor armature to rotate at a speed such that the feed back voltage approximately equals the sum of the amplified differential voltage plus the base speed voltage.

Thus, the rod 12 is automatically fed with the precision necessary for satisfactory argon-shielded aluminum-arc welding. Obviously, however, the invention is suitable for other types of metal arc welding, such as open-arc and submerged-melt welding.

Switch 114 provides convenient means for using the control circuit either as an automatic arc length control, or as a constant speed control. When switch 114 is thrown to contact 116 the unit will operate as an automatic arc length control; but when switch 114 is thrown to contact 118 the amplified differential voltage being by-passed by circuit 120 is taken out of the control circuit, and the unit operates as a constant speed control.

I claim:

1. A circuit for automatically controlling the rate of rod feed in an arc welding system, comprising a rod feed motor, at least one thyratron whose output controls the speed of the rod feed motor, and means controlling the output of said thyratron comprising means applying to the input circuit of said thyratron a positive voltage of such magnitude that the thyratron delivers a current which drives the rod feed motor at approximately the correct speed to maintain a desired arc voltage, means applying to such thyratron input circuit a voltage proportional to the difference between the such desired arc voltage and the actual arc voltage, and means applying to such input circuit a negative voltage proportional to the speed of the rod feed motor, thereby automatically maintaining the actual arc voltage substantially at the desired value.

2. A circuit as described in claim 1, provided with means for eliminating the voltage proportional to the difference between the desired arc voltage and the actual arc voltage, so that the circuit operates as a constant rod-speed control.

3. An automatic metal arc control system for automatically controlling the feeding of a metal rod constituting an electrode as it is progressively fused and deposited upon metal work constituting a cooperative electrode in a metal arc circuit including such rod and work, comprising means including a rod feed motor for feeding such rod toward the work, a speed control circuit for controlling the speed of said motor, an adjustable base speed selector coupled to said speed control circuit for supplying an output to said circuit for producing approximately the correct motor speed to maintain a desired arc voltage between such rod and the work, an adjustable arc voltage selector for delivering a reference voltage proportional to the desired arc voltage between such rod and the work, a comparing circuit responsive to such reference voltage and a voltage proportional to the actual arc voltage for delivering an error voltage which is proportional to the difference between such voltages, and an amplifier coupled between said comparing circuit and said speed control circuit for amplifying such error voltage and feeding its output to the speed control circuit, said speed control circuit being responsive to the combined outputs of said base speed selector and the amplifier, the base speed selector output serving to keep the rod speed near the desired value, and the amplifier output serving as a vernier control to bring the rod speed to substantially the exact speed required to maintain the desired arc voltage.

4. An automatic metal arc welding control system for automatically controlling the feeding of a metal rod constituting a welding electrode as it is progressively fused and deposited upon metal work constituting a cooperative electrode in a metal arc welding circuit including such rod and work, comprising means including a rod feed motor for feeding such rod toward the work, a speed control circuit for controlling the speed of said motor, an adjustable base speed selector coupled to said speed control circuit for supplying an output to said circuit for producing approximately the correct motor speed to maintain a desired welding arc voltage between such rod and the work, an adjustable arc voltage selector for delivering a reference voltage proportional to the desired welding arc voltage between such rod and the work, a comparing circuit responsive to such reference voltage and a voltage proportional to the actual welding arc voltage for delivering an error voltage which is proportional to the difference between such voltages, an amplifier coupled between said comparing circuit and said speed control circuit for amplifying such error voltage and feeding its output to the speed control circuit, and means for delivering to the speed control circuit a voltage proportional to the speed of rod feed motor.

5. An automatic metal arc welding control system for automatically controlling the feeding of a metal rod constituting a welding electrode as it is progressively fused and deposited upon metal work constituting a cooperative electrode in a metal arc welding circuit including such rod and work, comprising means including a rod feed motor for feeding such rod toward the work, a speed control circuit for controlling the speed of said motor, an adjustable base speed selector coupled to said speed control circuit for supplying an output to said circuit for producing approximately the correct motor speed to maintain a desired welding arc voltage between such rod and the work, an adjustable arc voltage selector for delivering a reference voltage proportional to the desired welding arc voltage between such rod and the work, and a comparing circuit responsive to such reference voltage and a voltage proportional to the actual welding arc voltage for delivering an error voltage which is proportional to the difference between such voltages, said speed control circuit being responsive to the combined outputs of said base speed selector and said error voltage, the base speed selector serving to keep the rod speed near the desired value and the error voltage serving as a vernier control to bring the rod speed to substantially the exact speed required to maintain the desired arc voltage.

6. An automatic metal arc welding control system for automatically controlling the feeding of a metal rod constituting a welding electrode as it is progressively fused and deposited upon metal work constituting a cooperative electrode in a metal arc welding circuit including such rod and the work, a speed control circuit for controlling the speed of said motor, an adjustable base speed selector coupled to said speed control circuit for supplying an output to said circuit for producing approximately the correct motor speed to maintain a desired welding arc voltage between such rod and the work, an adjustable arc voltage selector for delivering a reference voltage proportional to the desired welding arc voltage between such rod and the work, a comparing circuit responsive to such reference voltage and a voltage proportional to the actual welding arc voltage for delivering an error voltage which is proportional to the difference between such voltages, and means for applying to the speed control circuit a voltage proportional to the speed of the rod feed motor, said speed control circuit being responsive to the combined outputs of the base speed selector, the error voltage and the voltage proportional to the speed of the rod feed motor.

7. An automatic metal arc welding control system for automatically controlling the feeding of a metal rod as it is progressively fused and deposited upon metal work under a stream of inert monatomic gas of the class consisting of argon and helium, in a metal arc welding circuit including such rod and work, said system comprising a motor for feeding such rod toward the work, a circuit for controlling the speed of said motor, an adjustable base speed selector coupled to said speed control circuit for supplying a voltage to said circuit for producing approximately the correct motor speed to maintain a desired welding arc voltage, an adjustable arc voltage selector for delivering a reference voltage proportional to the desired arc voltage, a comparing circuit responsive to such reference voltage and a voltage proportional to the actual welding arc voltage for delivering an error voltage which is proportional to the difference between such voltages, and an amplifier coupled between said comparing circuit and said speed control circuit for amplifying such error voltage and feeding the latter to the speed control circuit, whereby such speed control circuit is responsive to the combined base speed selector voltage and the amplified error voltage, the base speed selector serving to set the rod speed near the desired value, and the amplified error voltage serving to bring the rod speed to substantially the exact speed required to maintain the desired arc voltage.

8. A system for automatically controlling the feeding of a metal rod constituting an electrode as it is progressively fused in metal constituting a cooperative electrode in an electrical circuit including such rod and metal, comprising a motor for feeding such rod toward the metal, a circuit for controlling the speed of said motor, an adjustable base speed selector coupled to said speed control circuit for supplying a voltage to said circuit for producing approximately the correct motor speed to maintain a desired voltage between the rod and metal, an adjustable voltage selector for delivering a reference voltage approximately equal to a desired voltage between such rod and metal, a comparing circuit responsive to such reference voltage and the actual voltage for delivering a differential voltage which is proportional to the difference between such voltages, and an amplifier coupled between said comparing circuit and said speed control circuit for amplifying such differential voltage and feeding the latter to the speed control circuit, whereby such speed control circuit is responsive to the combined base speed selector voltage and the amplified differential voltage, the base speed selector voltage serving to set the rod speed near the desired value, and the amplified differential voltage serving to bring the rod speed to substantially the exact speed required to maintain the desired voltage.

9. A system as described in claim 8, provided with means for eliminating the voltage proportional to the difference between the desired arc voltage and the actual arc voltage, so that the system operates as a constant rod-speed control.

10. A system as described in claim 8, provided with means for eliminating the amplified differential voltage so that the circuit can be operated at base speed.

11. A circuit for automatically controlling the rate of rod feed in an arc welding system, comprising a rod feed motor, at least one thyratron whose output controls the speed of the rod feed motor, and means controlling the output of said thyratron, said means including means applying to the control circuit of said thyratron a voltage proportional to the difference between a reference voltage which is proportional to the desired arc voltage and the actual arc voltage, and means for applying to such control circuit in potential opposition to such differential voltage, a voltage proportional to the speed of the rod feed motor.

12. A metal arc welding system for controlling the feeding of a metal rod as it is progressively fused and deposited upon metal work under a stream of gas containing gas selected from the class consisting of argon and helium, such rod and work being selected from the class consisting of carbon steel, stainless steel and aluminum, in a metal arc welding circuit including such rod and work, said system comprising a motor for feeding such rod toward the work, and a control circuit for controlling the speed of said motor, said control circuit comprising a circuit for automatically controlling the rate of rod feed in an arc welding system, comprising a rod feed motor, at least one thyratron whose output controls the speed of the rod feed motor, and means controlling the output of said thyratron, said means including means applying to the control circuit of said thyratron a voltage proportional to the difference between a reference voltage which is proportional to the desired arc voltage and the actual arc voltage, and means for applying to such control circuit in potential opposition to such differential voltage, a voltage proportional to the speed of the rod feed motor.

ROSCOE R. LOBOSCO.

References Cited in the file of this patent

UNITED STATES PATENTS

| Number | Name | Date |
|---|---|---|
| 2,008,411 | Blankenbuehler et al. | July 16, 1935 |
| 2,145,010 | Kennedy et al. | Jan. 24, 1939 |
| 2,329,127 | Levy | Sept. 7, 1943 |
| 2,445,789 | Lobosco | July 27, 1948 |